United States Patent [19]

Morita

[11] Patent Number: 5,461,940
[45] Date of Patent: Oct. 31, 1995

[54] OUTBOARD MOTOR ENGINE

[75] Inventor: Toshimasa Morita, Hamamatsu, Japan

[73] Assignee: Sanshin Kogyo Kabushiki Kaisha, Hamamatsu, Japan

[21] Appl. No.: 145,479

[22] Filed: Oct. 29, 1993

[30] Foreign Application Priority Data

Oct. 29, 1992 [JP] Japan .................. 4-312667

[51] Int. Cl.⁶ .................. F16C 3/04; F16C 11/00; F02B 75/06
[52] U.S. Cl. .................. 74/603; 74/591; 74/595; 74/605; 123/192.2
[58] Field of Search .................. 74/603, 604, 591, 74/595, 605; 123/192.1, 192.2

[56] References Cited

U.S. PATENT DOCUMENTS

| 4,414,934 | 11/1983 | Vogl et al. | 123/192.2 |
|---|---|---|---|
| 4,565,169 | 1/1986 | Suzuki | 74/603 X |
| 4,569,316 | 2/1986 | Suzuki | 74/603 X |
| 4,690,111 | 9/1987 | Kohno et al. | 74/604 X |
| 4,766,857 | 8/1988 | Laine et al. | 74/603 X |
| 5,218,885 | 6/1993 | Nakano et al. | 123/192.2 X |

FOREIGN PATENT DOCUMENTS

| 52-48707 | 4/1977 | Japan | 74/603 |
|---|---|---|---|
| 58-77950 | 5/1983 | Japan | 74/603 |
| 63-192693 | 8/1988 | Japan . | |
| 3-224894 | 10/1991 | Japan . | |
| 4-145246 | 5/1992 | Japan | 74/603 |
| 5-71585 | 3/1993 | Japan | 74/603 |
| 2091814 | 8/1982 | United Kingdom | 74/603 |
| 2209579 | 5/1989 | United Kingdom | 74/603 |

*Primary Examiner*—Vinh T. Luong
*Attorney, Agent, or Firm*—Knobbe, Martens, Olson & Bear

[57] ABSTRACT

A balancing arrangement for a reciprocating machine such as an internal combustion engine employed in the powerhead of an outboard motor. The balancing arrangement includes a balancing shaft rotatably journalled at the interface between the cylinder block and crankcase and which is offset to one side of the crankshaft from which it is driven. The balancer shaft has balancing masses which pass between the cheeks of the throws of the crankshaft during rotation so as to provide a compact assembly.

21 Claims, 2 Drawing Sheets

OUTBOARD MOTOR ENGINE

BACKGROUND OF THE INVENTION

This invention relates to an outboard motor engine and more particularly to a balancing arrangement for a reciprocating machine.

As is well known, reciprocating machines have certain forces which are inherently unbalanced. These are caused by such actions as the mass of the piston and connecting rod reciprocating to transmit drive between a crankshaft on which the connecting rod is journalled and the piston. Normally it is the practice to employ counter weights on the crankshaft so as to balance at least some of these reciprocating masses. However, it is also desirable to provide other means of balancing such as balancing shafts which also have eccentric masses and which are driven so as to rotate at the same speed but at an opposite direction as the crankshaft for balancing purposes. Although these balancing arrangements have a number of advantages, they do present problems in connection with engine design.

This is particularly true when the engine is employed as the power source for a marine propulsion unit such as an outboard motor wherein compact construction is desired. In order to avoid the churning of the lubricant in the crankcase chamber, it has been proposed to position the balancer shaft at one end or the other of the engine and to drive it from the crankshaft. This removes the balancer mass from the crankcase and avoids the problems with the lubricant. However, this has the effect of increasing the length of the engine which is not desirable in an outboard motor. It is desirable in an outboard motor to keep the length of the engine as short as possible so as to maintain a relatively low center of gravity for facilitating tilt and trim operation of the outboard motor.

Another disadvantage of providing the balancer shaft at one end of the engine is that the external portion of the engine does not afford the same degree of rigidity as the area in the crankcase and the support for the balancer shaft and balancer mass presents problems which can add to the overall size and weight of the engine.

If the balancer shaft and balancer masses are positioned in the crankcase chamber, on the other hand, then engine tends to become enlarged in the fore and aft direction when employed with an outboard motor. This also is undesirable because it is preferred to keep the size of the engine as small as possible since it must be contained within a protective cowling and it is also desirable to maintain the top end of the outboard motor very compact.

It is, therefor, a principle object of this invention of this invention to provide an improved balancing arrangement for an outboard motor.

It is another object of this invention to provide a balancer arrangement for a reciprocating machine that will provide a compact construction and yet nevertheless be robust and have good support and excellent balancing characteristics.

SUMMARY OF THE INVENTION

This invention is adapted to be embodied in a balancer arrangement for a reciprocating machine which is comprised of a cylinder block having at least one cylinder bore in which a piston reciprocates. A crankcase member is affixed to the cylinder block and defines with the cylinder block a crankcase chamber in which a crankshaft rotates. A connecting rod connects a piston to a throw of the crankshaft for transmitting motion therebetween. A balancer shaft is journalled for rotation in the crankcase chamber and has a balancer mass affixed eccentrically thereto and which is disposed in axial alignment with the crankshaft throw. Means drive the balancer shaft and balancer mass from the crankshaft.

DETAILED DESCRIPTION OF THE PREFERRED EMBODIMENT OF THE INVENTION

Figure 1:
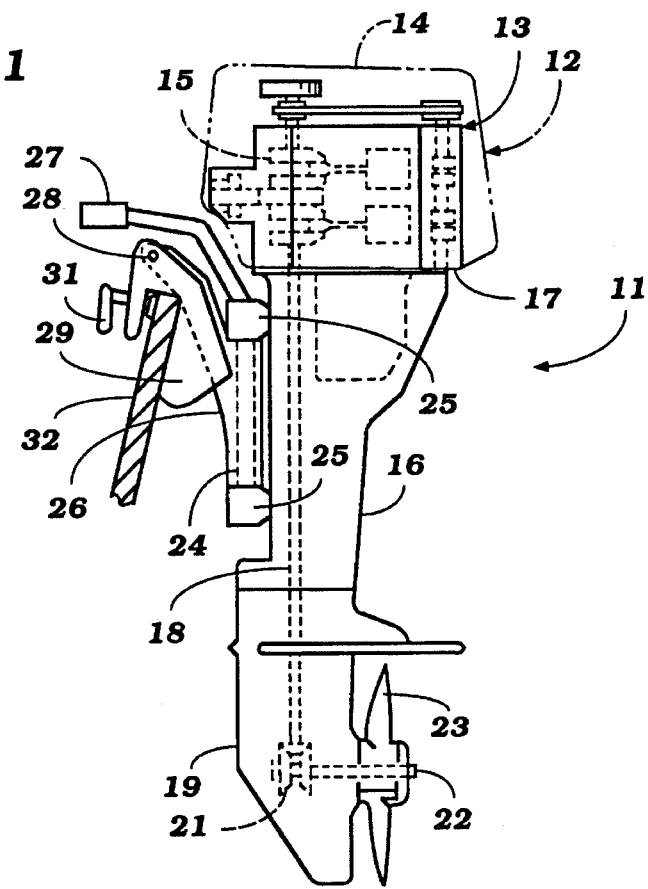
FIG. 1 is a side elevational view of an outboard motor attached to the transom of an associated watercraft, shown partially and in cross-section, with the protective cowling of outboard motor shown in phantom to more clearly show the construction of the engine.

Referring in detail to the drawings and initially to FIG. 1, an outboard motor constructed in accordance with an embodiment of the invention as identified generally by the reference numeral 11. The invention is described by way of orientation for use in an outboard motor because outboard motors are normally powered by reciprocating internal combustion engines and this invention has particular utility with balancing arrangements for such reciprocating machines. It is to be understood, however, that the invention may be employed with other types of reciprocating machines and other applications for such machines. The invention has particular utility, however, in connection with outboard motors because such outboard motors demand compact internal combustion engines and this invention provides a very compact balancing arrangement for such engines.

The outboard motor 11 is comprised of a powerhead, indicated generally by the reference numeral 12 which is comprised of an internal combustion engine 13 and a surrounding protective cowling which is shown in phantom and identified by the reference numeral 14. As is well known, this protective cowling 14 is comprised of a lower tray member and an upper removable cowling portion. As is typical with outboard motor practice, the engine 13 is disposed in the powerhead 12 so that its crankshaft 15 rotates about a vertically extending axis.

A driveshaft housing 16 is positioned beneath the powerhead 12 with a support plate 17 being interposed therebetween. A driveshaft 18 is rotatable journalled in the driveshaft housing 16 in a known manner and is coupled, in a manner to be described, for rotation with the crankshaft 15.

The driveshaft 18 depends into a lower unit 19 where there is provided a conventional forward, neutral, reverse, bevel gear transmission 21 for driving a propeller shaft 22 and propeller 23 in selected forward and reverse directions.

A steering shaft 24 is connected to the driveshaft housing 16 by upper and lower bracket assemblies 25. This steering shaft 24 is rotatable journalled for steering movement about a vertically extending steering axis within a swivel bracket 26. A tiller 27 is affixed to the upper end of the steering shaft 24 for steering of the outboard motor 11 in a well known manner.

The swivel bracket 26 is pivotally connected by means of a pivot pin 28 to clamping bracket 29 for tilt and trim movement of the outboard motor 11. A clamping device 31 is provided on the clamping bracket 29 for affixing the outboard motor 11 to a transom 32 of an associated watercraft which is shown only partially and in cross-section. The construction of the outboard motor 11 as thus far described may be considered to be conventional and, for that reason, further details of the construction of the portions of the outboard motor other than the engine 13 are not believed to be necessary for those skilled in the art to understand how the invention may be utilized.

Figure 2:
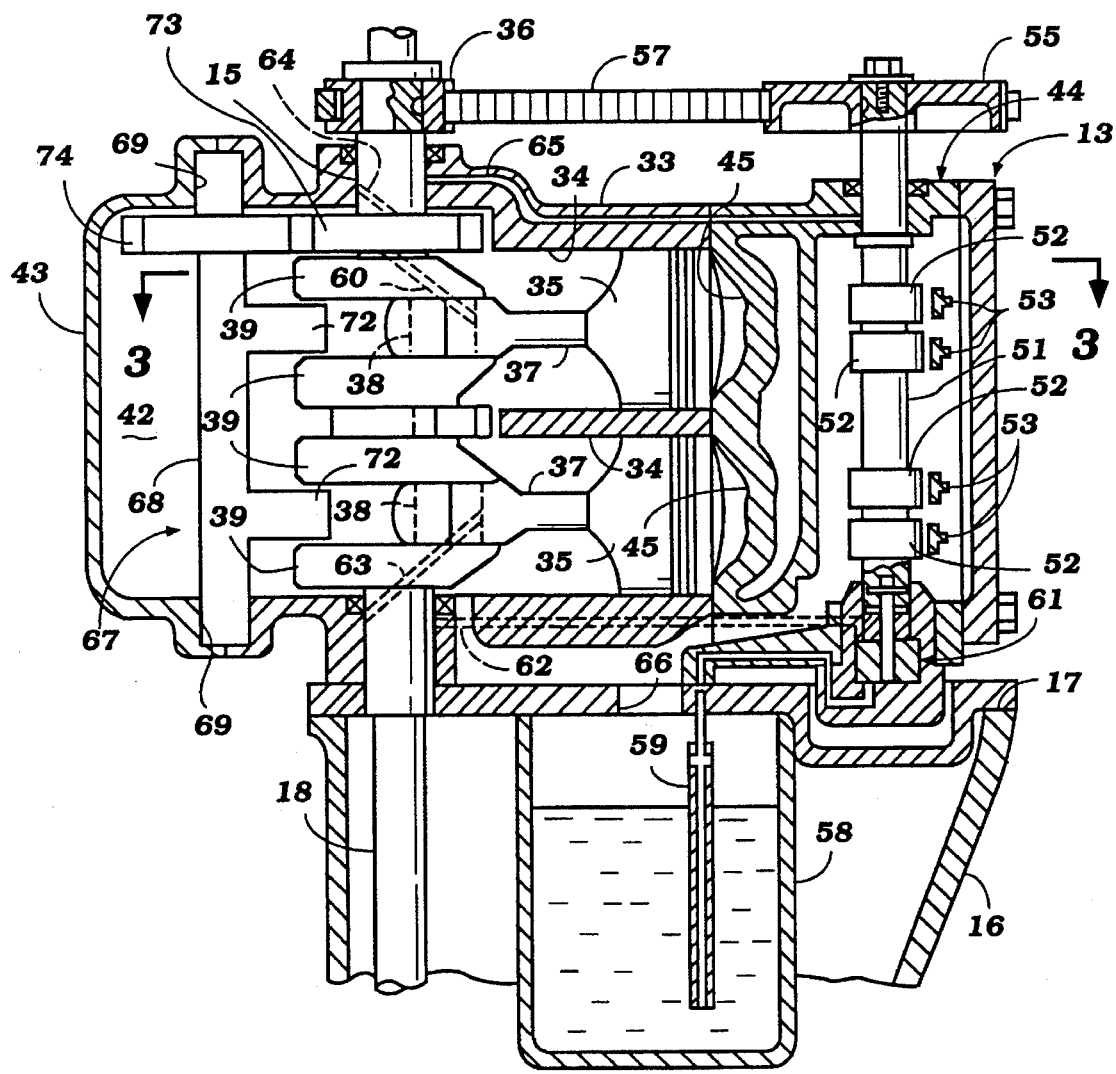
FIG. 2 is an enlarged cross-sectional view of the powerhead and upper portion of the driveshaft housing taken generally along the line 2—2 of FIG. 3.

The engine 13 will now be described in more detail by particular reference to FIGS. 2 and 3. The engine 13 is comprised of a cylinder block, indicated generally by the reference numeral 33 and which in the illustrated embodiment is of the two cylinder inline type having a pair of vertically spaced horizontally disposed cylinder bores 34. The cylinder bores 34 will be formed primarily by cylinder liners inserted into a light alloy cylinder block casting. Although the invention is described in conjunction with a two cylinder inline type of engine, it will be readily apparent to those skilled in the art how the invention may be practiced with reciprocating machines having other numbers of cylinder bores and other cylinder bore placement.

Pistons 35 are slidable supported in the cylinder bores 34 and are connected by means of piston pins 36 to the small ends of connecting rods 37. The connecting rods 37 are split at their lower ends and are journalled on the individual throws 38 of the crankshaft 15. These throws 38 are formed by facing cheeks 39 as is well known in this art. The cheeks 39 may be provided with balancing masses 41 for at least partially balancing the reciprocatory forces of the mass of the pistons 35 and connecting rods 37.

The crankshaft 15 is rotatably journalled in a crankcase chamber 42 formed by a skirt of the cylinder block 33 and a crankcase member 43 that is affixed, in a manner to be described, to the cylinder block 33. The lower end of the crankshaft 15 has a splined connection to the driveshaft 18.

A cylinder head assembly indicated generally by the reference numeral 44 is affixed to the cylinder block 43 in a known manner and has recesses 45 in its lower sealing face which form with the heads of the pistons 35 and the cylinder bores 34 the combustion chambers of the engine. In the illustrated embodiment, the engine 13 operates on a four stroke principle and has intake and exhaust valves 49 slidably supported in the cylinder head assembly 44 for controlling the flow of an intake charge from a suitable induction and charge forming system (not shown) to the combustion chambers and the discharge of the burnt charge from these combustion chambers to an exhaust manifold and exhaust system (also not shown). This exhaust system, as is typical with outboard motor practice, includes an expansion chamber provided in the driveshaft housing 16 and underwater high speed exhaust gas discharge and above the water low speed exhaust gas discharge. Since the invention deals with the balancing arrangement for the engine 13, to be described, further description of the induction and exhaust systems is not believed to be necessary to permit those skilled in the art to understand the construction and operation of the inventive portion of the engine.

The intake and exhaust valves 49 are operated by means of a single overhead camshaft 51 which has a plurality of lobes 52 that cooperate with rocker arms 53 mounted on rocker arm shafts 54 for operating the valves 49 in a well known manner.

The camshaft 51 has affixed to it a toothed sprocket 55 which is driven from a toothed sprocket 56 affixed to the upper end of the crankshaft 15 through a tooth timing belt 57. As is well know with four cycle engine practice, the camshaft 51 is driven at one half crankshaft speed.

The engine 13 is also provided with lubrication system which lubrication system is designed so that the crankcase chamber 42 need not hold the lubricant for the engine but merely serves as body wherein the lubricant can be collected and drained back to an oil tank 58 which is mounted on the under side of the spacer plate 17 and depends into the driveshaft housing 16.

A pick up tube 59 depends into this lubricant tank 58 and delivers lubricant to a gerotor type oil pump 61 which is driven off the lower end of the camshaft 51. Lubricant is delivered from this oil pump 61 to a main oil gallery 62 that communicates with cross drillings 63 in the crankshaft 15 for lubricating the throws 38 and connecting rods 37. A further cross drilling 64 at the upper end of the crankshaft 15 communicates with a passageway 65 formed in the cylinder block 33 and cylinder head 44 for delivering lubricant to the camshaft 51 for the lubrication of its bearings. This lubricant will then flow by gravity down the camshaft 51 to lubricate the cam lobes 52 and rocker arms 53.

The lubricant which is circulated through the engine as aforedescribed, and the lubrication system has only been described partially, is drained back to the oil pan 58 through a return drain 66 formed in the spacer plate 17.

As thus far described, the engine 13 may be considered to be conventional. In accordance with the invention, however, a balancer shaft arrangement, indicated generally by the reference numeral 67 is provided for balancing the portion of the reciprocating masses of the engine and for reducing the generation of couples. The balancer shaft arrangement 67 includes a balancer shaft 68 having a pair of end portions that are journalled in integral bearings 69 formed in the opposite faces of the cylinder block 33 and crankcase member 43. Similar bearing surfaces are also formed by the cylinder block 33 and crankcase member 43 for journalling the end main bearings of the crankshaft 15. Intermediate bearing caps may be provided in the crankcase chamber 42 for the center main bearing of the crankshaft 15 if desired.

Figure 3:
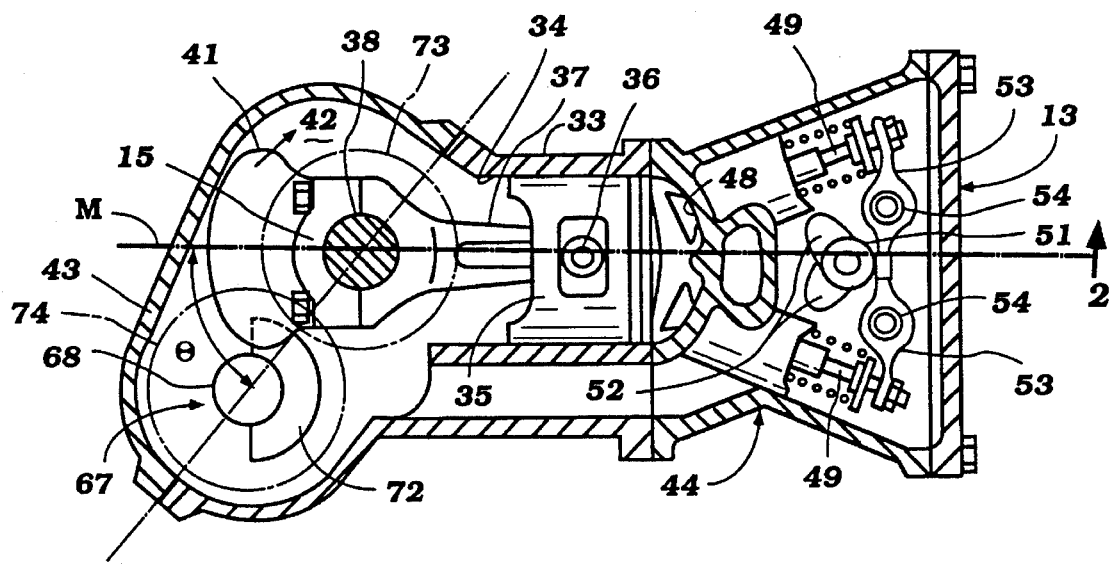
FIG. 3 is a cross-sectional view taken along the line 3—3 of FIG. 2 on a reduced scale.

In accordance with an important feature of the invention, it should be noted that the parting line, indicated by the line 71 in FIG. 3 between the cylinder block 33 and crankcase member 43 does not extend perpendicularly to the axes M of the cylinder bores 34 as is conventional practice. Rather, this parting line 71 extends at an acute angle to the normal horizontal parting line so as to permit the axes of rotations of the balancer shaft 68 and the crankshaft 15 to be disposed in somewhat side by side fashion. This provides a much more compact assembly as may be readily seen in FIG. 3. The parting line 71 also extends at an acute angle θ to the plain M containing the axes of the cylinder bores 33 as shown in FIG. 3.

Balancer masses 72 are formed integrally on the balancer shaft 68 and are disposed so as to extend into the area between the cheeks 39 of the crankshaft 15 and in relatively close proximity to the throws 38. Because of this somewhat nesting type of relationship, the axes of the shafts 68 and 15 may be placed much closer together than was the previous practice. This further adds to the compact configuration of the engine 13.

The balancer shaft 68 is driven at the same speed as the crankshaft 15 but in an opposite direction by means of a drive gear 73 that is affixed to the upper end of the crankshaft 15 within the crankcase chamber 42 and a corresponding driven gear 74 that is either affixed to or formed integrally with the balancer shaft assembly 67. Hence, the drive for the balancer shaft assembly 67 and the balancer shaft assembly 67 can all be positioned in the crankcase chamber 42. However, because of the fact that the oil tank 58 is positioned in the driveshaft housing 16 this positioning the balancer shaft assembly 67 in the crankcase chamber 42 will not cause any churning of the lubricant or aeration of it.

It should be readily apparent that the described construction provides a very compact balancing arrangement for a reciprocating machine that lends it to successful use as a compact power plant for an outboard motor. In addition, the arrangement is such that a very rigid support is provided for the balancer shaft. Of course, the foregoing description is that of a preferred embodiment of the invention and various changes and modifications may be made without departing from the spirit and scope of the invention, as defined by the appended claims.

I claim:

1. A balancing arrangement for a reciprocating machine comprised of a cylinder block having at least one cylinder bore in which a piston reciprocates, a crankcase member affixed to said cylinder block and defining with said cylinder block a crankcase chamber in which a crankshaft rotates about a crankshaft axis, a connecting rod connecting said piston to a throw of said crankshaft for transmitting motion therebetween, a balancer shaft journaled for rotation in said crankcase chamber about a balancer shaft axis parallel to and offset from said crankshaft axis and having a balancer mass affixed thereto and disposed axially in alignment with said crankshaft throw, said balancer shaft axis being disposed on the opposite side of a plane containing the crankshaft axis and extending perpendicular to the cylinder bore from the cylinder bore, and means for driving said balancer shaft from said crankshaft.

2. A balancing arrangement as set forth in claim 1 wherein the throw being comprised of a pair of spaced apart cheeks connected to a connecting rod bearing that receives the connecting rod for connecting the connecting rod to the crankshaft, the balance mass extends between said cheeks of the throw of the crankshaft during at least a portion of the balancer shaft and crankshaft rotations.

3. A balancing arrangement as set forth in claim 2 wherein the engine has at least a pair of cylinder bores, pistons, connecting rods and crankshaft throws and wherein the balancer shaft has a plurality of balancer masses affixed thereto each aligned with a respective one of the throws of the crankshaft.

4. A balancing arrangement as set forth in claim 3 wherein the balancer shaft is driven from the crankshaft by a gear train positioned within the crankcase chamber at the upper end thereof.

5. A balancing arrangement as set forth in claim 1 wherein the axis of rotation of the balancer shaft is not in line with the cylinder bore axis.

6. A balancing arrangement for a reciprocating machine comprised of a cylinder block having at least one cylinder bore in which a piston reciprocates, a crankcase member affixed to said cylinder block and defining with said cylinder block a crankcase chamber in which a crankshaft rotates, a connecting rod connecting said piston to a throw of said crankshaft for transmitting motion therebetween, a balancer shaft journaled for rotation in said crankcase chamber and having a balancer mass affixed thereto and disposed axially in alignment with said crankshaft throw, and means for driving said balancer shaft from said crankshaft, said axes of rotation of said balancer shaft and said crankshaft lying in a plane that is disposed at an acute angle to a plane containing the axis of the cylinder bore and the axis of rotation of the crankshaft, the crankcase member and the cylinder block having mating surfaces along the plane defined by the axes of rotation.

7. A balancing arrangement as set forth in claim 6 wherein the balancer shaft and crankshaft are journalled by the crankcase member and the cylinder block.

8. A balancing arrangement as set forth in claim 7 wherein the axes of rotation of the crankshaft and the balancer shaft are parallel to each other and wherein the balance mass extends between the cheeks of the throws of the crankshaft during at least a portion of the balancer shaft and crankshaft rotations.

9. A balancing arrangement as set forth in claim 8 wherein the engine has at least a pair of cylinder bores, pistons, connecting rods and crankshaft throws and wherein the balancer shaft has a plurality of balancer masses affixed thereto each aligned with a respective one of the throws of the crankshaft.

10. A balancing arrangement as set forth in claim 9 wherein the balancer shaft is driven from the crankshaft by a gear train positioned within the crankcase chamber at the upper end thereof.

11. A balancing arrangement for a reciprocating machine comprised of a cylinder block having at least one cylinder bore in which a piston reciprocates, a crankcase member affixed to said cylinder block and defining with said cylinder block a crankcase chamber in which a crankshaft rotates, a connecting rod connecting said piston to a throw of said crankshaft for transmitting motion therebetween, a balancer shaft journaled for rotation in said crankcase chamber and having a balancer mass affixed thereto and disposed axially in alignment with said crankshaft throw, means for driving said balancer shaft from said crankshaft, said reciprocating machine comprising an internal combustion engine forming a portion of an outboard motor and driving a propulsion device for propelling an associated watercraft, said crankshaft being rotatable about a vertically extending axis in the outboard motor.

12. A balancing arrangement as set forth in claim 11 wherein the propulsion device is carried by a driveshaft housing and lower unit depending from a powerhead including the internal combustion engine and further including an oil pan for containing lubricant for the engine in the driveshaft housing.

13. A balancing arrangement as set forth in claim 12 wherein the axis of rotation of the crankshaft and the balancer shaft are parallel to each other the throw being comprised of a pair of spaced apart cheeks connected to a connecting rod bearing that receives the connecting rod for connecting the connecting rod to the crankshaft, and wherein the balance mass extends between said cheeks of said throw of the crankshaft during at least a portion of the balancer shaft and crankshaft rotations.

14. A balancing arrangement as set forth in claim 13 wherein the engine has at least a pair of cylinder bores, pistons, connecting rods and crankshaft throws and wherein the balancer shaft has a plurality of balancer masses affixed thereto each aligned with a respective one of the throws of the crankshaft.

15. A balancing arrangement as set forth in claim 14 wherein the balancer shaft is driven from the crankshaft by a gear train positioned within the crankcase chamber at the upper end thereof.

16. A balancing arrangement as set forth in claim 12 wherein the axis of rotation of the balancer shaft is not in line with the cylinder bore axis.

17. A balancing arrangement as set forth in claim 16 wherein the axes of rotation of the balancer shaft and the crankshaft lie in a plane that is disposed at an acute angle to a plane containing the axis of the cylinder bore and the axis of rotation of the crankshaft, the crankcase member and the cylinder block have mating surfaces along the plane defined by the axes of rotation.

18. A balancing arrangement as set forth in claim 17 wherein the balancer shaft and crankshaft are journalled by the crankcase member and the cylinder block.

19. A balancing arrangement as set forth in claim 18 wherein the axes of rotation of the crankshaft and the balancer shaft are parallel to each other and wherein the balance mass extends between the cheeks of the throws of the crankshaft during at least a portion of the balancer shaft and crankshaft rotations.

20. A balancing arrangement as set forth in claim 19 wherein the engine has at least a pair of cylinder bores, pistons, connecting rods and crankshaft throws and wherein the balancer shaft has a plurality of balancer masses affixed thereto each aligned with a respective one of the throws of the crankshaft.

21. A balancing arrangement as set forth in claim 20 wherein the balancer shaft is driven from the crankshaft by a gear train positioned within the crankcase chamber at the upper end thereof.

* * * * *